April 11, 1967   J. H. BROWN   3,314,046
SEISMIC WIDE RANGE MAGNETIC TAPE RECORDING
Filed Oct. 8, 1964                                    2 Sheets-Sheet 1

INVENTOR.
JAMES H. BROWN
BY
Russell E. Schloff
ATTORNEY

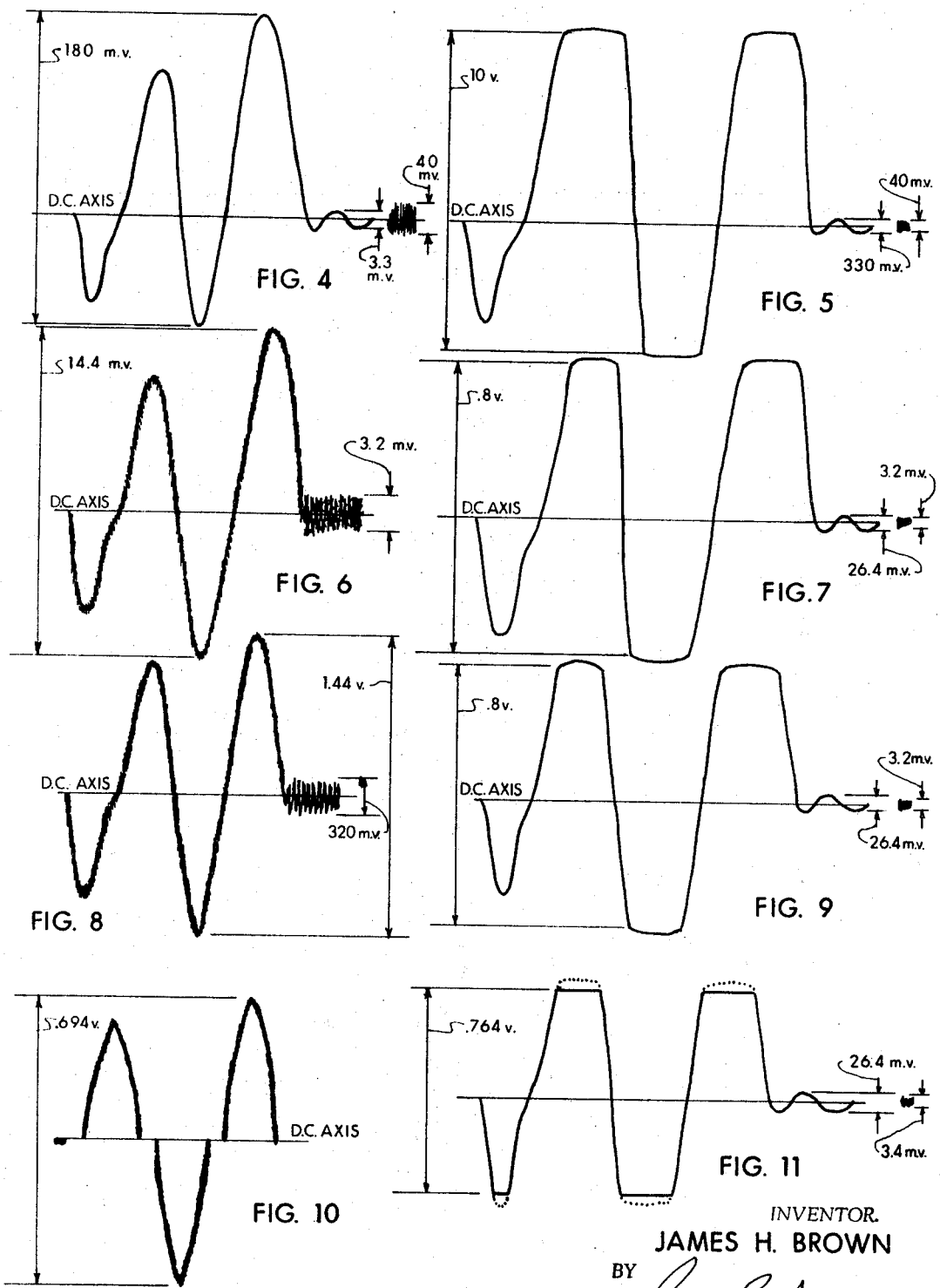

United States Patent Office 3,314,046
Patented Apr. 11, 1967

3,314,046
SEISMIC WIDE RANGE MAGNETIC TAPE
RECORDING
James H. Brown, Houston, Tex., assignor to Dresser Sie,
Inc., Dallas, Tex., a corporation of Delaware
Filed Oct. 8, 1964, Ser. No. 402,418
14 Claims. (Cl. 340—15.5)

This invention relates to wide range magnetic tape recording, and more particularly, to a method and apparatus for recording in analog form the full dynamic amplitude range of a seismic signal and later processing such recording.

While present methods and apparatus of recording seismic reflection exploration signals provide valuable information concerning many formations, they have definite limitations. In seismic reflection exploration, there is an energy producing process, usually the denotation of an explosive in a shot hole or the generation of a seismic shock on the surface of the earth, which sets up an elastic wave that travels through the earth in all directions. Upon encountering boundaries of unlike materials, a part of the wave energy is reflected, the magnitude, character, and direction of propagation of the reflected wave being in accordance with well-known geophysical laws. One or more detectors, connected to a recording device and placed in a predetermined position with respect to the point of energy generation receives the reflected waves and translates the waves into an electrical signal representative of the amplitude and frequency of the wave. In addition to amplitude and frequency, the time of arrival, with respect to the initiation of the shock, is precisely determined. If the records of events are sufficiently clear and definite, various characteristics of the formation can be readily determined by well-known means.

Originally, the signals were photographically recorded on film for visual presentation and analysis. Recording seismic signals in this manner did not permit facile handling of the data so as to be able to take advantage of the numerous operations possible with computers. Moreover, although the dynamic range transmitted by the geophone is in the neighborhood of 90 db, the normally recorded range is compressed by various techniques of dynamic gain control and ultimately reduced to a range in the neighborhood of 20 db due to limitations of oscillographic recorders.

The introduction of magnetic tape as a recording medium for the geophysical industry resulted in improved seismic records which lent themselves to computer techniques. Having the original field data on magnetic tape, the geophysicist is able to perform, without destroying the original field record, operations such as normal move out removal, weathering and elevation corrections, stacking, compositing, mixing, and plotting in various forms.

Although important improvements in instrumentation and techniques have been made, the trend has been to use automatic gain control, programmed gain control, filtering, and mixing, etc., in magnetic tape recording of seismic signals. By recording seismic signals in this manner, the true dynamic range of the geophone signal is not recorded. The various techniques compress the signal with the result that the amplitude of the recorded signal is reduced. Also, generation of new freqeuncy components, by the use of such techniques, distorts the frequency of the signal.

Since the theoretical geophysicist has determined that having a record of the entire amplitude range available would be of value in fully analyzing the formation, it is desirable that the entire dynamic range of the geophone signal be recorded and preserved. This is particularly true since the use of computers permits the analysis and evaluation of such information. However, it is only the information, which is preserved by field recording, that is available for such processing, and as explained above, the present practice of seismic recording results in loss of intelligence.

Accordingly, it is the object of the present invention to provide a means of making an analog recording having at least a 90 db range which preserves the full amplitude range delivered by the seismic detector.

It is another object to make a recording of data obtained from a seismic geophone in which all intelligible data is preserved for later utilization.

It is a further object to record the information received by a geophone on two channels of a magnetic tape and to then provide means for recombining the two channels together at playback so that one discrete signal with a minimum amount of phaseshift and distortion in present.

It is still a further object to enable the seismic industry to record, without the use of program gain control, automatic gain control, or other techniques which would compress the signal, the full dynamic range of field energy received by a geophone.

The method and apparatus for accomplishing the above objects and other objects will appear more apparent from the detailed description which is about to follow.

The present invention provides a method of recording the full dynamic range received by the field geophone. The method, in general, comprises forming the seismic signal into two like signals. One of these signals is amplified to a precise level. The other signal is conditioned at unity level. The two signals are recorded simultaneously on a magnetic tape. The recordings are played back, and the signal which previously had been unamplified is now amplified. The two signals are discretely mixed and combined in order to form a composite signal which truely reflects the amplitude and frequency of the original signal received by the geophone with no appreciable phase shift.

One form of apparatus for performing the present invention is comprised of a field recording unit having a pre-amplifier which feeds into the primary of a transformer. The transformer has two secondary windings, each of which will produce an identical signal. One signal is fed into a buffer amplifier which conditions the signal. The entire conditioned signal is fed to a modulator from where it is presented to a dual head of a magnetic tape recorder for recording on a first channel of a magnetic tape. The other signal is fed into an amplifier which amplifies the signal 100 times. The amplified signal is then fed into a clipper which clips the signal at a precise level. The modulator then represents the unclipped portion of the signal to the dual head of the tape recorder for simultaneous recording with the conditioned signal on a second channel of the magnetic tape. To obtain a combined discrete signal, the two channels of the magnetic tape are simultaneously played back. Each signal is fed into a demodulator for demodulation. The previously amplified signal is fed into a buffer amplifier, and the unamplified signal is fed into an amplifier which amplifies it 100 times that of the signal passing through the buffer amplifier. The unamplified signal is then fed into a clipper network which clips the unamplified signal just below the level of the clipper in the recording unit. At the same time, the unamplified signal now being amplified is fed into a rejection network which rejects all of the signal below the precise level of the clipped signal. The two signals are algebraically added to form a composite singal with a clean clipping between them. This composite signal may then be put through an impedance output stage for low impedance matching whereafter it can be fed into a digital computer. For a more complete understanding of the invention, reference should now be had to the following detailed description taken in conjunction with the accompanying drawings in which:

FIG. 4 is a schematic representation of the seismic signal shown in FIG. 1 just prior to recording on channel A of the field recording unit.

FIG. 5 is similar to FIG. 4 showing the seismic signal just prior to recording on channel B of the field recording unit.

FIG. 6 is similar to FIG. 4 showing the seismic signal after playback in channel A of the playback unit.

FIG. 7 is similar to FIG. 4 showing the seismic signal after playback in channel B of the playback unit.

FIG. 8 is similar to FIG. 4 showing the seismic signal on channel A of the playback unit after 100 times amplification.

FIG. 9 is similar to FIG. 4 showing the seismic signal in channel B of the playback unit after unity level amplification.

FIG. 10 is similar to FIG. 4 showing the seismic signal at the output of the level sensitive rejection network of the playback unit.

FIG. 11 is similar to FIG. 4 showing the seismic signal at the output of level sensitive clipping network of the playback unit.

Since it would be difficult to graphically represent the true relative relation between areas of high and low amplitude in various signal stages illustrated in FIG. 4 through FIG. 12, the magnitude of the electrical energy involved is set forth for each figure.

Figure 1:
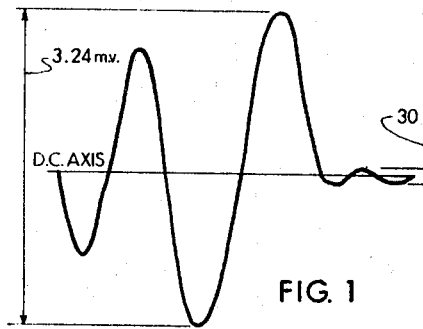
FIG. 1 is a schematic representation of a portion of a typical seismic signal as received by a seismic detector.

Before discussing the method of any system for handling a seismic signal in order to obtain a seismic record in analog form having at least a 90 db range, it is felt desirable to first examine a seismic signal itself. A seismic signal is derived by initiating a seismic shock and then capturing the seismic waves energy resulting from such shock by one or more geophones which are positioned at distances relative to the point of the seismic shock. Today, the most common type of seismic exploration is the reflection survey in which the energy waves reflected by various interfaces in the earth's surface are received by the geophones. However, in addition to the reflected waves, many other energies, such as waves traveling directly through the weathering layer and earth noise, are also received by the geophone. The wave traveling directly through the weathering layer usually arrives first and is of greater intensity than the reflected waves at the geophones positioned closest to the point of shock initiation. Therefore, the first part of the seismic signal is usually larger than the latter part of the signal, particularly since the wavelet information decays proportionately to the velocity, substructural content and loop distance. FIG. 1 shows a schematic representation of a typical seismic signal as received by a geophone. The seismic signal may be asymmetrical over several cycles. In addition to containing desired information, the seismic signal also contains earth noise. Due to the fact that a portion of the signal is large in relation to other portions of the signal and because there is a high signal to noise ratio, it is difficult to record the seismic wave in its true form with the present limitations of electronic instrumentation.

For many years, it was the practice of the geophysical industry to photographically record the seismic signal by use of oscillographic recorders. As a rule, the intelligible and recordable portion of the seismic signal lasts about five seconds and was recorded at the rate of 12 inches per second. Therefore, a photographic record about 60 inches in length resulted from each seismic shock. Although the geophone has the capabiilty of receiving or deriving a signal with an amplitude range of about 90 db, the range of a multiple trace oscillographic recording camera is in the neighborhood of about 20 db. Therefore, the signal was compressed to meet the requirement of the recorders.

Some years ago, the seismic industry, as well as photographically recording the seismic signal in the field, started to record the seismic signal on magnetic tape. This practice enabled the geophysicist to perform numerous computer operations with the seismic field data without ever destroying the original field record. Due to the large fluctuations in the seismic signals and its asymmetrical nature, various practices were used in the magnetic recording of seismic signals, such as automatic gain control and programmed gain control. These techniques compressed the amplitude of the seismic signal with the result that the amplitude of the recorded signal was reduced. Also, the techniques resulted in the generation of new frequency components which distorted the frequency of the seismic signal. In order to fully utilize various computer techniques to more fully analyze the formation, the theoretical geophysicist has determined that it would be desirable to having a record of the entire amplitude range. Therefore, as previously mentioned, the primary object of the invention is to provide apparatus for and a method of obtaining in analog form a true record of the seismic signal received by the geophone.

To obtain a recording of a seismic signal having at least a 90 db range, the signal received by the geophone is divided in the field into two like signals of equal amplitude and identical phase. The two signals are then simultaneously recorded on two channels of a magnetic tape. One channel is at unity level, and the other channel is at 40 db above unity level while approximate identical phase relationship is maintained. The two magnetic tape recordings are simultaneously played back. The channel which was recorded at unity level is amplified 40 db above unity level, while the other channel is played back at unity level. These two playback outputs are then combined into a discrete signal having phase, relative amplitude, and the D.C. axis identical to the original seismic signal. This recombining provides a discrete signal whch is comparable with the signal received by the geophone.

Figure 2:
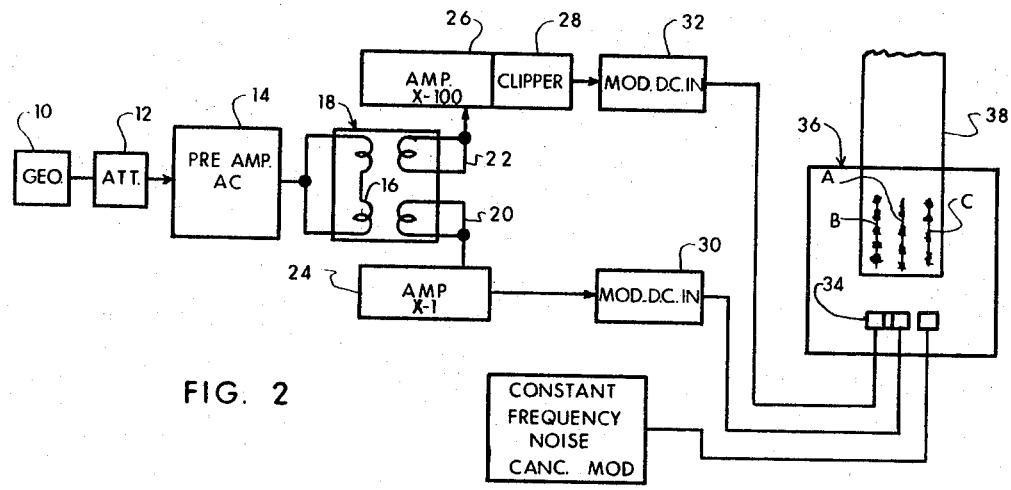
FIG. 2 is a block diagram of a field recording unit.
Figure 3:
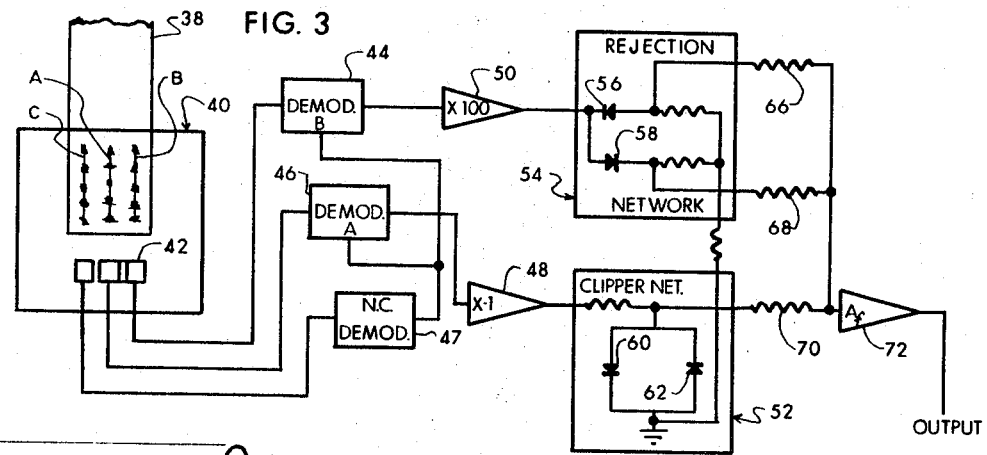
FIG. 3 is a block diagram of a playback unit for recombining the two channels of magnetic tape obtained from the field recording unit into a discrete signal.

One form of apparatus for accomplishing this is shown in FIGS. 2 and 3. FIG. 2 illustrates the apparatus for the field recording the signal at two different levels and FIG. 3 illustrates the apparatus for recombining the two recordings into one discrete signal with a minimum of phase shift and distortion.

As previously mentioned, a plurality of geophones may be utilized to receive the waves, resulting from a single seismic shock. However, for purposes of illustration, the apparatus for recording the results from one geophone is shown. As is well-known in the art, a duplicate set of apparatus is utilized for each geophone with the exception that a multiple channel type recorder is usually used to record the signals from all of the geophones on a single tape.

A geophone 10 is an instrument capable of converting energy into an electric signal. As previously mentioned, the electrical signal delivered by the geophone can cover more than a 90 db range. However, the range of interest for seismic exloration is generally not greater than 90 db. Also, the frequency band width of primary geophysical interest is from 5 cycles to 300 cycles. The electrical signal derived by the geophone 10 is fed into an input attenuator 12 which allows selection of the smallest signal above the system noise floor that the system is capable of recording. One reason for attenuating the signal received from the geophone is to allow individual amplifier gain tailoring for the difference in signal levels obtained from geophones close to the seismic shock and signal levels obtained from geophones far away from the seismic shock. The attenuator 12 cuts both the signal and noise to match the electrical signal to the capability of subsequent components.

Since the signal from the geophone 10 is neither of sufficient level or energy, the attenuated electrical signal is fed into a preamplifier 14 which provides linear gain for the signal so that it can drive subsequent components. The preamplifier 14 is so designed that it will provide linear gain over a full 90 db range and will handle 110 db range with less than 1 percent distortion.

The signal from the preamplifier 14 is fed into the primary winding 16 of a splitting transformer 18 which has two separate secondary windings 20–22. The secondary windings 20–22 are so designed that an identical signal is developed in each secondary winding. The signals on the secondary windings 20–22 are the same in amplitude and phase as the signal on the primary winding 16. Other signal splitting means for introducing the same seismic signal into two channels, the means having a common input, may also be used.

The signal from the secondary winding 20 of the splitting transformer 18 is fed into a buffer 24 which will provide a gain of one which conditions the signal to provide both the correct D.C. level and impedance for further processing. The buffer amplifier 24 is a D.C. amplifier and is so designed that the D.C. axis of the signal remains accurate.

The signal from the secondary winding 22 of the splitting transformer 18 is fed into a high gain amplifier 26 which provides a gain of 100. The high gain amplifier 26 has a clipper section 28. The high gain amplifier 26 is a D.C. amplifier and is so designed that the central axis of the signal remains accurate.

The outputs from the amplifiers 24–26 are fed into modulators 30 and 32 respectively, which translate the signals into FM form. The signal up to the time of modulation is represented by changes in amplitude; however, for magnetic recording, it is converted so that changes are now represented as changes in frequency. The modulators 30–32 are so designed so that there will be no shift in signal phase or central axis. The modulated signals are simultaneously then fed into a dual head 34 of a magnetic tape recorder 36, for simultaneous recording on a strip of magnetic tape 38. The signal from the buffer amplifier 24 is recorded on one channel of th magnetic tape 38 which will hereinafter be referred to as channel A. The signal from the high gain amplifier 26 is recorded on a second channel of the magnetic tape 38 which will hereinafter be referred to as channel B. The dual head 34 is so designed that the two signals are recorded on channels A and B of the magnetic tape 38 with a maximum phase error of $\frac{1}{10}$ of 1 millisecond of each other due to physical head alignment. If the same tape recorder is used in playback as in recording, the criticality of the spacing of the dual head is eliminated. However, if a different recorder is used at playback, it is necessary to maintain a close tolerance on head gap position to control phase shift. Also, although a dual head is preferred, since once manufactured to the proper tolerance, the position of the pickups are properly aligned, two heads properly positioned may be used. In order to utilize noise cancelling techniques well-known in the magnetic recording industry, an additional channel C may be recorded on the magnetic tape 38 simultaneously with recording of channels A and B. A constant frequency, the same as the center carrier frequency used in the signal modulators, is used as the signal for channel C.

While FM magnetic tape recording is illustrated, other well-known types of magnetic tape recording, such as bias recording or pulse width recording, may be utilized in which event the components necessary to condition the signal would be used.

FIG. 4 illustrates the portion of the signal illustrated in FIG. 1 as recorded on channel A. As can be seen, all of the signal is recorded; however, due to the noise floor of the recording equipment (approximately 50 db), small signals (more than 50 db below the 100 percent level of the modulators) are lost in the noise floor. FIG. 5 illustrates the portion of the signal illustrated in FIG. 1 recorded on channel B. As can be seen, the recorded signal represents an amplification of small amplitudes of the seismic signal, above and below the D.C. axis. This amplification causes the small signals, which were lost in the noise floor of Channel A, to be large enough for recording.

To obtain a discrete signal, the field recorded tape 38 is played back by the aparatus illustrated in FIG. 3 which recombines the two recorded signals from the field recording apparatus shown in FIG. 2 into one composite signal. As can be seen, the playback apparatus has a tape recorder 40 having a dual head 42 similar to the dual head 34 of the recorder 36. The head 42 simultaneously picks off the signals from the two channels A and B. Since the signals on the tape 38 are in FM form, the playback apparatus is provided with a pair of demodulators 44–46. The signal from each channel is fed into its respective demodulator for demodulation. That is, changes in the signal are converted back to changes in amplitude. The demodulators 44–46 are so designed that there will be no shift in phase or center axis of the signal.

To improve the signal to noise ratio of the recorder, well-known noise cancelling techniques can be used by use of noise cancelling networks 47 and the noise correcting channel C. This technique increases the range of retrievable signal allowing commercial grade tape recorders to be used to obtain at least a 90 db signal range handling capability.

As can be seen in FIG. 4, the amplitude of small wave on the right-hand side is smaller than the noise level. Therefore when recorded on tape, the small wave will be obscured by the noise. In addition to the noise floor of the recorder, there will be additional noise resulting from playback and FIG. 6 illustrates the condition of the seismic signal after playback. As can be seen, the small amplitude wave on the right-hand side of the signal is completely obscured. In addition to the obscuring of the small amplitude wave, there is noise riding on the entire signal which causes the trace to appear fuzzy. Noise will usually be readily visible riding on the signal whenever the noise level is twenty percent of the signal level. In comparison, it can be seen in FIG. 5 that the small amplitude wave has been sufficiently amplified so that it is larger than the noise level. Therefore, even after playback, the signal in channel B is still relatively free from noise as can be seen in FIG. 7. In this case, the noise level is so low with respect to the signal level that the noise does not break through.

The signal from recorder channel B, which was previously amplified, is fed into a buffer amplifier 48 of the playback unit which amplifies it to unity level or a slight gain. FIG. 9 shows the signal as it appears at the output of amplifier 48. The signal from recorder channel A, which was previously unamplified, is fed into a high gain amplifier 50 of the playback unit which amplifies the signal 100 times the amplification the buffer amplifier 48 received. FIG. 8 shows the signal as it appears at the output of amplifier 50. As in the recording unit, the buffer amplifier 48 and high gain amplifier 50 of the playback unit are D.C. amplifiers and are so designed that there is no phase shift or shift of center axis.

The signal from buffer amplifier 48 is fed into a level sensitive clipping network 52 and the amplified signal from amplifier 50 is fed into a level sensitive rejection network 54. The buffer amplifier 48 has just sufficient gain to amplify the 100 percent level recovered from channel B demodulator to just slightly more (1 db or 2 db) than the forward conducting level at the level sensitive clipping network 52. The high gain amplifier 50 is then set to have 100 times the gain of the buffer amplifier 48.

The level sensitive clipping network 52 is formed of two carefully matched silicon diodes 56–58 which are connected in parallel and in reverse polarity to each other. The clipping network 50 utilizes the forward conducting foot of the diodes 56–58 as a level sensitive clipper. All of the signal below the conducting level is passed unattenuated by the diodes. Everything above the conducting level is clipped by the diodes 56 and 58. FIG. 1 illustrates the signal as it would appear at the output of the clipping network 52. As can be seen, the rounded peaks of the large amplitude waves have been squared off.

The level sensitive rejection network 54 is formed of two carefully matched silicon diodes 60–62 and a compensating resistor network 64. By proper adjustment, the rejection network 54 can be made to reject all levels beow the level at which the level sensitive clipping network 52 clips. If properly adjusted, the rejection network 54 rejects a level equivalent to 8 to 9 db above the noise level of the amplified channel to minimize noise distortion. FIG. 10 illustrates the signal as it would at the output of the clipping network 52. As can be seen, only the peaks of the large amplitude waves remains. All of the remaining portions of the signal have been clipped.

Since the forward conducting foot of the silicon diodes is temperature sensitive, it is preferable that the silicon diodes are maintained at a near constant temperature, preferably below 25° C.

The output of the level sensitive clipping network 52, and the output of the level sensitive rejection network 54 are fed through independent resistors 66–68–70 and then algebraically added together to form a composite signal with a minimum of distortion.

Figure 12:
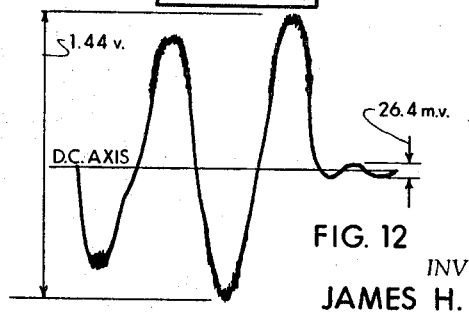
FIG. 12 is similar to FIG. 4 showing the resultant composite signal.

FIG. 12 illustrates the composite signal. As can be seen, the small amplitude wave at the right side is faithfully reproduced. Although some noise has broken through at the peak of the left-hand wave, it is not such that it would cause difficulty in interpretation. The seismic industry considers that a seismic signal which has a signal level greater than twice the noise level as being visible and providing coherent information. The composite signal may be fed into a low gain impedance amplifier 72 for low impedance matching. The output of the amplifier 72 is the recombined signal output which can be used for entry into digital equipment or utilized for further processing and display by other analog equipment and methods. If desired, the two signals from the demodulators may be fed directly into a computer and the computer programmed to amplify the unamplified signal and combine or otherwise process the two signals.

As can be seen from the foregoing, a method of and a system for recording a seismic signal having at least a 90 db range is disclosed. In essence, the same seismic signal is introduced into two amplification networks. One network amplifies its signal to unity or some other predetermined level. The other signal is amplified to a predetermined level which is greater than the amplification of the first network. The two signals are then simultaneously recorded on two channels of a magnetic tape. While small amplitude portions of the signal may be obscured in the noise level of the unity level channel, the other channel is sufficiently amplified so that even the small amplitude portions will be above the noise level and recorded. The two channels are in true phase relation. The magnetic tape is then played back, and the previously higher amplified channel is amplified at unity level, or some other predetermined level. The previously lower amplified signal is amplified to a level bearing the same ratio to the other playback amplification as that which was present during recording. The two amplified signals are then processed so that a portion of one signal is clipped and a portion of the other rejected at a precise level. The resultant portions of the two signals are algebraically added to form a composite signal. Due to the amplification and processing of the signals, the small amplitude portions of the signal are above the noise level and faithfully reproduced and the final signal is representative of the true amplitude and frequency derived from the geophone without any phase shift within the frequency band of interest. The composite signal may be used in various computer programs for full analyzation of the formation under seismic investigation.

While preferred forms of the invention have been illustrated and described in detail, it is understood that various changes may be made by those skilled in the art without departing from the scope of the invention as defined in the appended claims.

What is claimed is:

1. The method of recording the seismic signal derived from a geophone with at least a 90 db range comprising:
   preamplifying the signal received from the geophone to condition it for further processing;
   splitting the signal into two like signals;
   amplifying one signal at unity level;
   amplifying the other signal 100 times unity level;
   clipping said amplified other signal to a precise level;
   modulating both signals;
   simultaneously recording the modulated signals on two separate channels of a magnetic tape;
   playing back the tape;
   demodulating each channel;
   amplifying said previously amplified other signal at unity level;
   amplifying the previously unity level recorded signal 100 times unity level;
   clipping said 100 times amplified one signal at slightly below the level of said clipped amplified other signal;
   rejecting all portions of said 100 times amplified playback one signal above said precise level of the clipped signal and combining the two playback signals into a composite signal.

2. The method of recording the seismic signal derived from a geophone with at least a 90 db range comprising:
   splitting the seismic signal into two like signals;
   amplifying one signal at unity level;
   amplifying the other signal 100 times unity level;
   clipping said other amplified signal to a precise level;
   conditioning both signals for magnetic tape recording;
   simultaneously recording the modulated signal on two separate channels of a magnetic tape;
   playing back the tape;
   amplifying the previously amplified other signal at unity level;
   amplifying the previously unity level recorded one signal 100 times unity level;
   clipping said 100 times amplified one signal at slightly below the level of said clipped amplified other signal;
   rejecting all portions of said 100 times amplified playback one signal above said precise level of the clipped signal;
   algebraically adding the two playback signals to form a composite signal.

3. The method of recording the seismic signal derived from a geophone with at least a 90 db range comprising:
   preamplifying the signal received from the geophone to condition it for further processing;
   splitting the preamplified signal into two like signals;
   amplifying one signal at unity level;
   amplifying the other signal 100 times units level;
   clipping said other amplified signal to a precise level;
   simultaneously recording the signals on two separate channels of a magnetic tape;
   playing back the tape;

amplifying the previously amplified other signal at unity level;
amplifying the previously unity level recorded one signal 100 times unity level;
clipping said 100 times amplified one signal at slightly below the level of said clipped amplified other signal;
rejecting all portions of said 100 times amplified playback one signal above said precise level of the clipped signal; combining the two playback signals into a composite signal.

4. The method of recording the seismic signal derived from a geophone with at least a 90 db range comprising:
splitting the seismic signal into two like signals;
conditioning for recording one signal at unity level;
amplifying the other signal 100 times unity level;
simultaneously recording the signals on two separate channels of a magnetic tape;
playing back the tape;
conditioning the previously amplified other signal at unity level;
amplifying the previously unity level recorded one signal 100 times;
combing the two playback signal into a composite signal.

5. The method of recording the seismic signal derived from a geophone with at least a 90 db range comprising:
splitting the seismic signal into two like signals;
amplifying one signal to a predetermined level,
amplifying the other signal to a greater predetermined level;
simultaneously recording the amplified signals on two separate channels of a magnetic tape;
playing back the tape;
amplifying the previously amplified other signal to a predetermined level;
amplifying the previously lesser amplified one signal to the same ratio as used in recording;
algebraically adding the two playback signals to form a composite signal.

6. A system for recording the seismic signal received by a geophone in analog form having at least a 90 db range, comprising:
a preamplifier receiving the signal derived from the geophone and conditioning it for further processing;
a splitting transformer having a primary winding which receives the signal from the preamplifier and two identical secondary windings which produce two identical signals;
a first buffer amplifier which receives one signal from the splitting transformer;
a first high gain amplifier which receives the other signal from the splitting transformer and amplifies it 100 times;
a cliper which receives the amplified signal from said first high gain amplifier and clips it at a predetermined level;
a pair of modulators, one of which receives the signal from said first buffer amplifier and the other of which receives the signal from the clipper, for modulating the signals;
a tape recording having a dual head which receives the modulated signals and records them simultaneously on two separate channels of a magnetic tape;
means for playing back the magnetic tape;
a pair of demodulators, one receiving the signal from one channel and the other receiving the signal from the other channel, for demodulating the signals;
a second buffer amplifier receiving the demodulated signal from the amplified signal channel;
a second high gain amplifier receiving the demodulated signal from the unamplified signal channel and amplifying said demodulated signal from unamplified signal channel 100 times the amplification of said first buffer amplifier;
a level sensitive cliping network which receives the signal from said second buffer amplifier and clips it at just below the level of the clipper;
a level sensitive rejection network which receives the signal from said second high gain amplifier and rejects all of the signal below the level of the signal clipped by the clipper network;
means for combining the two signals from said rejection network and said clipping network into a composite signal; and
an impedance output stage for low impedance matching.

7. A system for recording the seismic signal received by a geophone in analog form having at least a 90 db range, comprising:
a preamplifier receiving the signal derived from the geophone and conditioning it for further processing;
signal splitting means receiving the signal from the preamplifier and producing two identical signals;
a first buffer amplifier which receives one signal from the signal splitting means;
a first high gain amplifier which receives the other signal from the signal splitting means and amplifies it 100 times;
a clipper which receives the amplified signal from said first high gain amplifier and clips said amplified signal at a predetermined level;
a pair of modulators, one of which receives the signal from said first buffer amplifier and the other of which receives the signal from said first high gain amplifier, for modulating the signals;
a tape recorder which receives the modulated signals and records them simultaneously on two separate channels of a magnetic tape;
means for playing back the magnetic tape;
a pair of demodulators, one receiving the signal from one channel and the other receiving the signal from the other channel, for demodulating the signals;
a second buffer amplifier receiving the demodulated signal from the amplified signal channel;
a second high gain amplifier receiving the demodulated signal from the unamplified channel and amplifying it 100 times the amplification of said first buffer amplifier;
a level sensitive clipping network which receives the signal from said second buffer amplifier and clips it at just below the level of the clipper;
a level sensitive rejection network which receives the signal from said second high gain amplifier and rejects all of the signal below the level of the signal clipped by the clipper network;
means for combining the two signals from said rejection network and said clipping network into a composite signal.

8. A system for recording the seismic signal received by a geophone in analog form having at least a 90 db range, comprising:
a preamplifier receiving the signal derived from the geophone and conditioning it for further processing;
signal splitting means receiving the signal from the preamplifier and producing two identical signals;
a first buffer amplifier which receives one signal from the signal splitting means;
a first high gain amplifier which receives the other signal from the splitting transformer and amplifies it 100 times;
first conditioning means receiving the signals from the amplifiers and conditioning them for magnetic tape recording;
a tape recorder having two spaced heads which receives the signals from the conditioning means and records them simultaneously on two separate channels of a magnetic tape;
means for playing back the magnetic tape;
a pair of signal conditioning means, one receiving the signal from one channel and the other receiving the signal from the other channel;

a second buffer amplifier receiving the signal from amplified channel;

a second high gain amplifier receiving said first signal from the unamplified channel and amplifying it 100 times the amplification of the buffer amplifier;

a level sensitive clipping network which receives the signal from said second buffer amplifier and clips it;

a level sensitive rejection network which receives the signal from said second high gain amplifier and rejects all of the signal below the level of the signal clipped by the clipper network;

means for combining the two signals from said clipping network and said rejection network into a composite signal.

9. A system for recording the seismic signal received by a geophone in analog form having at least a 90 db range, comprising:

signal splitting means receiving the signal from the geophone and producing two identical signals;

a buffer amplifier which receives one signal from the splitting signal splitting means;

a first high gain amplifier which receives the other signal from the signal splitting means and amplifies it 100 times;

a tape recorder having two heads which receives the signals from the amplifiers and records them simultaneously on two separate channels of a magnetic tape;

means for playing back the magnetic tape;

a conditioning amplifier receiving the signal from amplified channel;

a second high gain amplifier receiving the signal from the unamplified channel and amplifying it 100 times the amplification of the conditioning amplifier;

means for combining the two signals for said second high gain amplifier and said conditioning amplifier into a composite signal.

10. A system for recording the seismic signal received by a geophone in analog form having at least a 90 db range, comprising:

a preamplifier receiving the seismic signal from the geophone and conditioning it for further processing;

signal splitting means receiving the signal from the preamplifier and producing two identical signals;

a buffer amplifier which receives one signal from the splitting signal splitting means;

a first high gain amplifier which receives the other signal from the signal splitting means and amplifies it to a predetermined level;

a tape recorder having two heads which receives the signals from the amplifiers and records them simultaneously on two separate channels of a magnetic tape;

means for playing back the magnetic tape;

means for conditioning the signals from said played back tape for further processing;

a conditioning amplifier receiving the conditioned playback signal from amplified channel;

a second high gain amplifier receiving the signal from the unamplified channel and amplifying it a predetermined multiple of the amplification of the conditioning amplifier;

a clipping network which receives the signal from the output of the conditioning amplifier and clips it just below the tape peak of the first amplified signal;

a rejection network which receives the signal from said second high gain amplifier and rejects all portions of the signal below the tape peak of the first amplified signal;

means for combining the two signals from said clipping network and said rejection network into a composite signal.

11. A system for recording the seismic signal received by a geophone in analog form having at least a 90 db range, comprising:

signal splitting means producing two identical signals;

signal conditioning means which receives one signal from the splitting signal splitting means and conditions it for magnetic tape recording;

a first high gain amplifier which receives the other signal from the signal splitting means and amplifies it to a predetermined level;

means receiving the amplified signal and conditioning it for tape recording;

a tape recorder which receives the conditioned signal and amplified signal and records them simultaneously on two separate channels of a magnetic tape;

means for playing back the magnetic tape;

a conditioning amplifier receiving the playback signal from amplified channel and conditioning it;

a second high gain amplifier receiving the signal from the unamplified channel and amplifying it to a predetermined level of amplification greater than the conditioning amplifier;

means receiving the signal from said conditioning amplifier and clipping it at a predetermined level;

means receiving the amplified signal from said second high gain amplifier and rejecting all portions of the amplified signal below a predetermined level;

means for combining the two signals from the means receiving the signal from said conditioning amplifier and from the means receiving the amplified signal from said second high gain amplifier into a composite signal.

12. A system for recording the seismic signal received by a geophone in analog form having at least a 90 db range, comprising:

signal splitting means producing two identical signals;

first signal conditioning means which receives one signal from the signal splitting means and conditions it for magnetic tape recording;

a first high gain amplifier which receives the other signal from the signal splitting means and amplifies it to a predetermined level;

means receiving the amplified signal and conditioning it for tape recording;

a tape recorder which receives the conditioned signal and amplified signal and records them simultaneously on two separate channels of a magnetic tape;

means for playing back the magnetic tape;

second signal conditioning means receiving the playback signal from amplified channel;

a second high gain amplifier receiving the signal from the unamplified channel and amplifying it a predetermined multiple of the amplification of the second conditioning means;

means clipping all portions of the first amplified signal above a predetermined level;

means rejecting all portions of the second amplified signal below the level of the clipping means;

means for combining the two signals into a composite signal.

13. Apparatus for recording the seismic signal received by a geophone in analog form, comprising:

a preamplifier receiving the signal derived from the geophone and conditioning it for further processing;

a splitting transformer having a primary winding which receives the signal from the preamplifier and two identical secondary windings which produce two identical signals;

a buffer amplifier which receives one signal from the splitting transformer;

a high gain amplifier which receives the other signal from the splitting transformer and amplifies it 100 times;

a clipper which receives the amplified signal from the high gain amplifier and clips it at a predetermined level;

a pair of modulators, one of which receives the signal from the buffer amplifier and the other of which receives the signal from the clipper, for modulating the signals;

a tape recorder having a dual head which receives the modulated signals and simultaneously records them on two separate channels of a magnetic tape.

14. Apparatus for playback and recombining a seismic signal which had previously been simultaneously recorded on two channels of a magnetic tape, wherein the signal in one of the channels had been previously amplified greater than the signal in said other channel, said apparatus comprising:

means for playing back the magnetic tape;

a dual head simultaneously picking the signals from the two channels of the tape;

a pair of demodulators, one receiving the signal from one channel and the other receiving the signal from the other channel, for demodulating the signals;

a buffer amplifier receiving the demodulated signal from the greater amplified channel;

a high gain amplifier receiving the demodulated signal from the less amplified channel and amplifying it 100 times the amplification of the buffer amplifier;

a level sensitive clipping network which receives the signal from the buffer amplifier and clips it at just below a predetermined level;

a level sensitive rejection network which receives the signal from the high gain amplifier and rejects all of the signal below the level of the signal clipped by the clipper network;

means for combining the two signals into a composite signal;

an impedance output stage for low impedance matching.

References Cited by the Examiner
UNITED STATES PATENTS

| | | | |
|---|---|---|---|
| 3,032,612 | 5/1962 | Goldmark | 179—100.2 |
| 3,084,224 | 4/1963 | Sanford | 179—100.2 |

BENJAMIN A. BORCHELT, *Primary Examiner.*

R. M. SKOLNIK, *Assistant Examiner.*